United States Patent [19]

Nelson

[11] 4,369,728
[45] Jan. 25, 1983

[54] AIR FILTER RESTRICTION INDICATING DEVICE

[75] Inventor: Joseph N. Nelson, Waterloo, Iowa

[73] Assignee: Engineered Products Company, Waterloo, Iowa

[21] Appl. No.: 232,422

[22] Filed: Feb. 9, 1981

[51] Int. Cl.³ .................. B01D 46/00; G01L 19/12
[52] U.S. Cl. .................. 116/276; 55/274; 73/709; 116/294
[58] Field of Search ............. 116/272, DIG. 42, 268, 116/274, 294, 276; 55/274; 73/709

[56] References Cited

U.S. PATENT DOCUMENTS

| | | | |
|---|---|---|---|
| 1,546,409 | 7/1925 | Schmidt | 73/315 |
| 1,600,825 | 9/1926 | Kraft | 73/709 |
| 3,066,527 | 12/1962 | Stein | 73/118 |
| 3,068,831 | 12/1962 | Witchell | 116/267 |
| 3,246,624 | 4/1966 | Lowther | 116/268 |
| 3,247,824 | 4/1966 | Rodgers | 116/114 PV |
| 3,443,365 | 5/1969 | Lee et al. | 55/274 |
| 3,465,707 | 9/1969 | Kashiwaba | 116/268 |
| 3,779,080 | 12/1973 | Smith | 73/709 |
| 3,939,457 | 2/1976 | Nelson | 116/DIG. 25 X |
| 4,033,733 | 7/1977 | Nelson | 116/268 |
| 4,100,878 | 7/1978 | Leinfelt | 116/268 |

*Primary Examiner*—Daniel M. Yasich
*Attorney, Agent, or Firm*—Allegretti, Newitt, Witcoff & McAndrews, Ltd.

[57] ABSTRACT

An improved air filter restriction indicating device is disclosed for use in connection with an internal combustion engine intake air filtration system. The improvement resides in a novel structure for resetting the indicating device which permits the indicating device to be reliably used in cold, wet environments and in particularly dirty, dusty environments.

5 Claims, 5 Drawing Figures

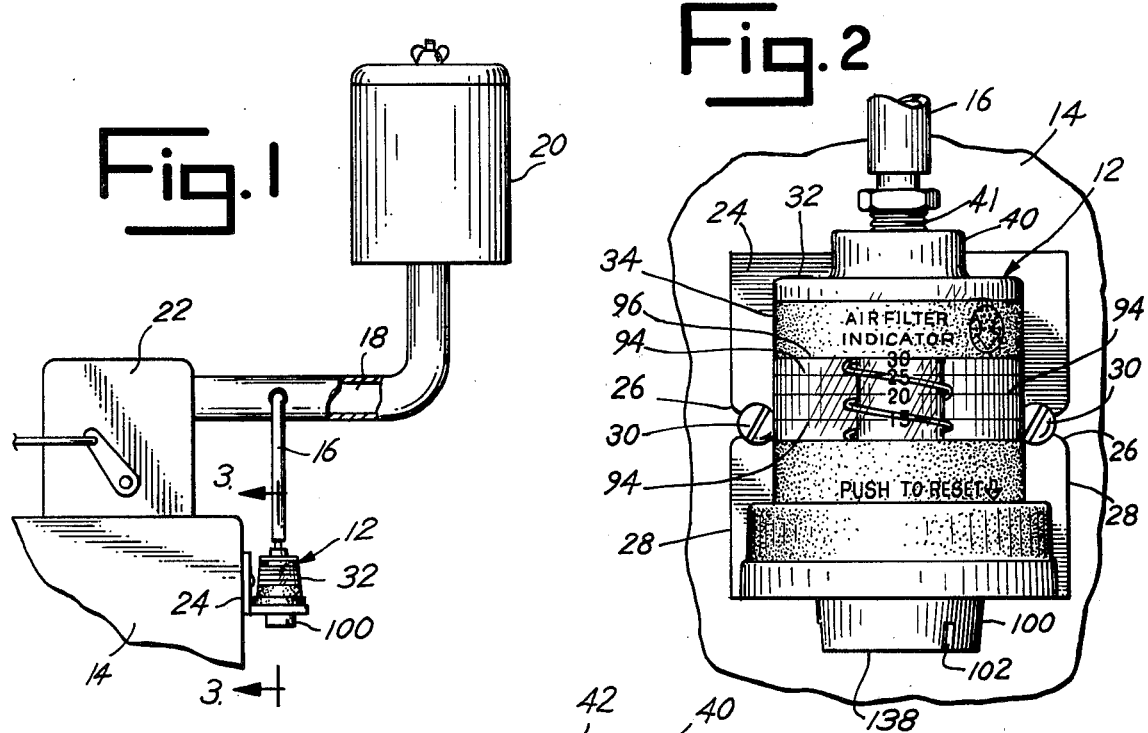
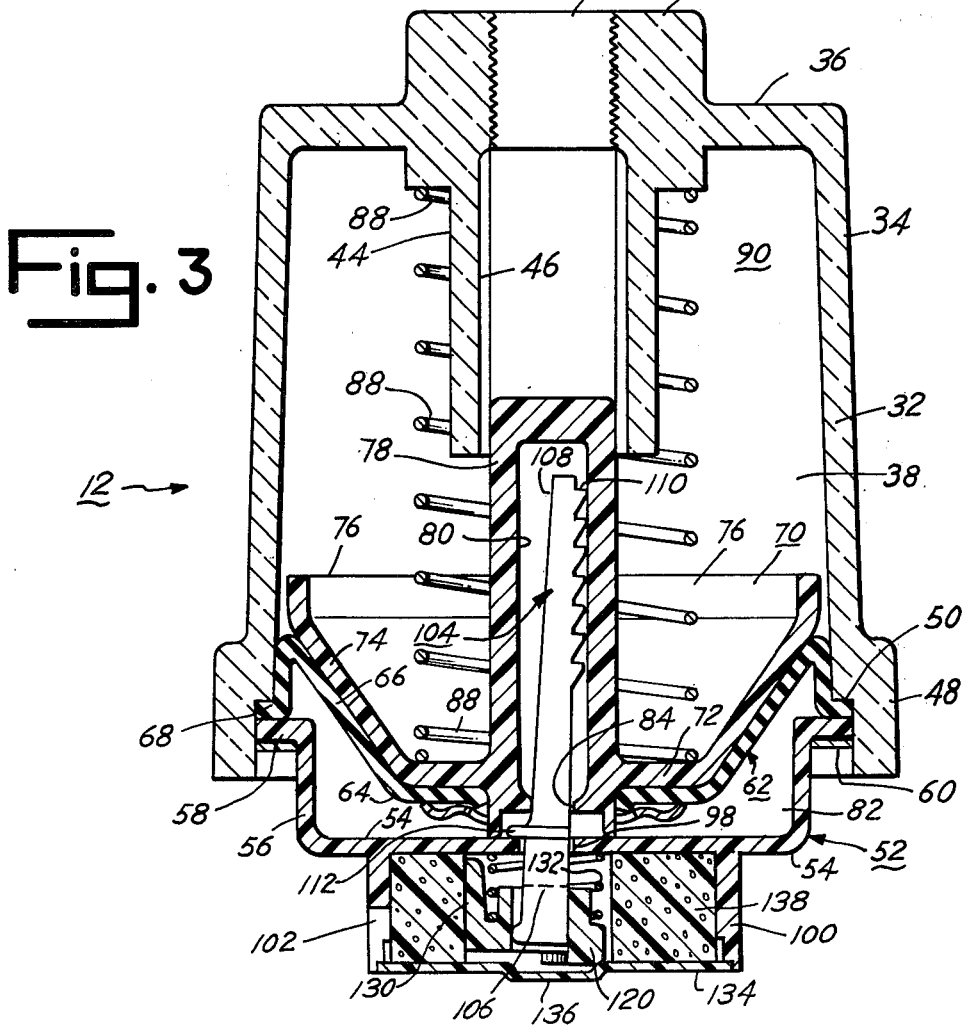

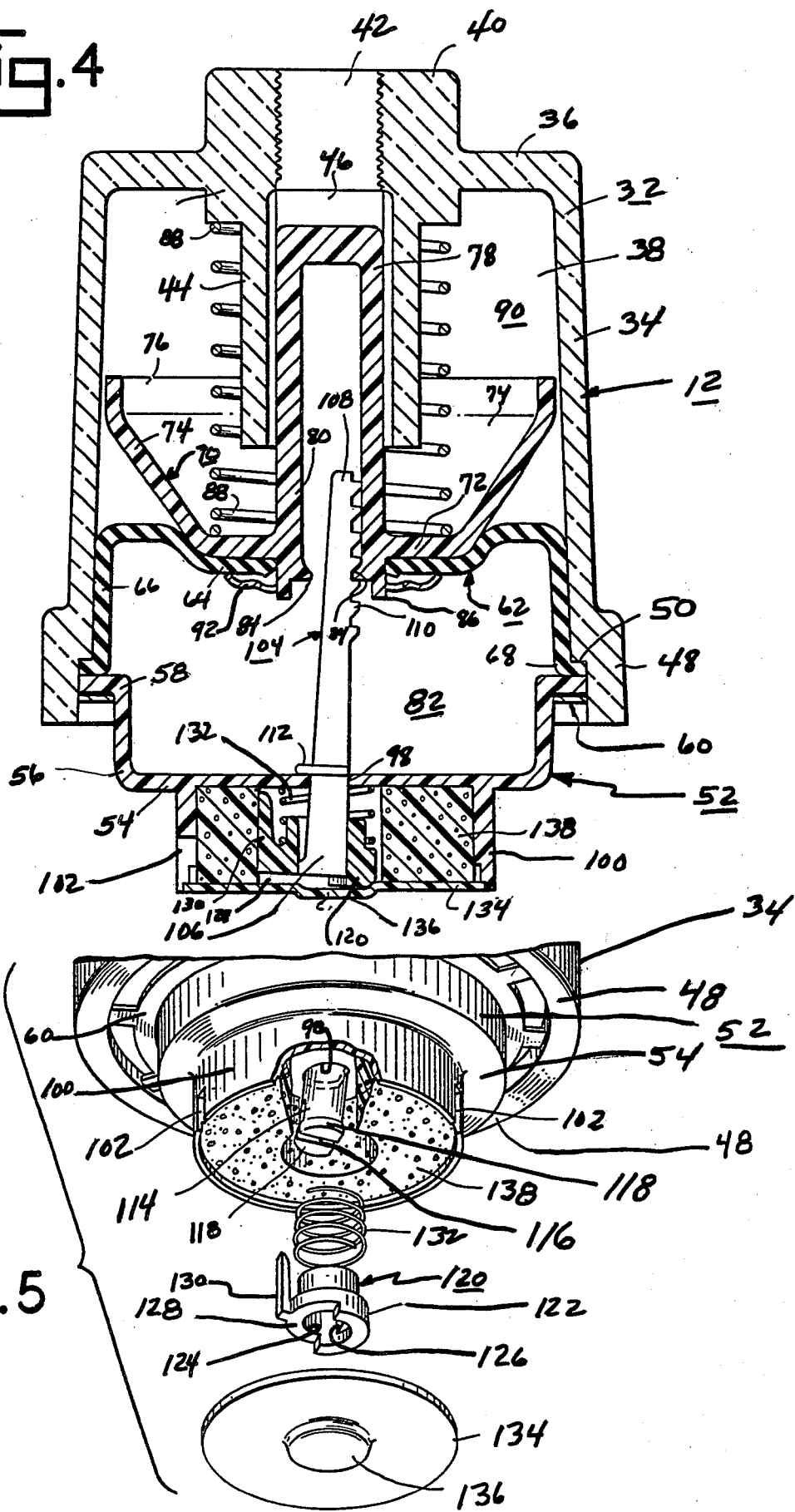

AIR FILTER RESTRICTION INDICATING DEVICE

BACKGROUND OF THE INVENTION

The present invention relates to an improvement for an air filter restriction indicating device adapted for use in connection with an internal combustion engine intake air filtration system, and more particularly for an air intake filtration system used with turbo-charged diesel engines in trucks, tractors and other heavy industrial and marine applications. Such an improved device is intended to indicate when the air filter has become so loaded or clogged with contaminants that its cleaning or replacement is required and also to lock itself in various intermediate, indicating positions so as to provide a continuous indication as to how much useful life remains in the air filter before it must be cleaned or replaced. My co-pending application, Ser. No. 273,699 filed June 16, 1981 describes such an air filter restriction indicating device.

While the aforesaid indicating device performs its intended function admirably, experience has shown that there is a possibility that the structure used to reset the indicating device, as when, for example, the air filter has been cleaned or replaced, may be rendered ineffective when the indicating device is used in a wet, cold environment or in a particularly dusty, dirty environment. The indicating device has a housing which encloses most of its components, but a part of the resetting structure is disposed without the housing and is exposed to the environment in which the indicating device is being used. An annulus of filter material surrounds this exposed part of the resetting structure and may become inflexible and stiff because of ice forming therein or thereon or because of dirt caking on or clogging the material. If the annulus is inflexible and stiff, the resetting structure is difficult to actuate and may be rendered ineffective. To minimize this possibility, it is recommended that the indicating device be mounted so that the end of the indicating device including the exposed part of the resetting structure is in a vertically down position, i.e. faced vertically downwardly.

To overcome these problems, the improved indicating device of the present invention includes a novel reset structure that prevents the structure from being rendered ineffective due to dirt and/or ice clogging. The improvement in the reset structure also allows the improved device to be mounted in any position, including in a vertically up position as well as in a vertically down position.

SUMMARY OF THE INVENTION

It is an object of the present invention to provide an improved air filter restriction indicating device including a novel resetting structure that permits the indicating device to be used even in extremely cold, wet environments and in particularly dirty, dusty environments and that remains fully and reliably operative even when the exterior of the indicating device has become thoroughly coated or caked with ice or dirt. It is a further object of the present invention to provide an improved air filter restriction indicating device which can be reliably operated in any position, including in a vertically up position or a vertically down position, in extremely cold, wet environments or dirty, dusty environments.

BRIEF DESCRIPTION OF THE DRAWINGS

FIG. 1 is a view in elevation showing an improved indicating device of the present invention in an operating arrangement with an internal combustion engine and air filter;

FIG. 2 is an enlarged, elevational view of the improved indicating device shown in FIG. 1;

FIG. 3 is an enlarged, vertical sectional view taken on line 3—3 of FIG. 1;

FIG. 4 is a view similar to FIG. 3 showing a different operating position; and

FIG. 5 is a partially cutaway, exploded view showing the components of the novel resetting structure of the present invention.

Throughout the various figures of the drawings, the same numerals will be used to designate the same parts. Moreover, when the terms "up", "down", "upward", "downward", "top", "bottom", "right", "left", "right end", "left end" and the like are used herein, it is to be understood that these terms have reference to the structure shown in the drawings as it would appear to a person viewing the drawings.

DESCRIPTION OF THE PREFERRED EMBODIMENT

Referring to the drawings, an air filter restriction indicating device constructed and operated in accordance with the present invention is shown generally at 12. More specifically, the indicating device 12 is shown, in FIG. 1, mounted on the side of a conventional internal combustion engine 14 and operatively connected to and in communication with an air tube 16. The air tube 16, in turn, communicates with the air flowing through the engine air intake line 18. The air line 18 permits air to flow from a conventional air filter unit 20 to the air intake portion 22 of the internal combustion engine 14. Air flowing through the air line 18, and thus in the air tube 16, is under a negative pressure or "vacuum" condition when the engine 14 is operating. This vacuum condition increases, i.e. the pressure of the air is reduced, as the conventional air filter element, not shown, in the filter element in the air filter unit 20 becomes increasingly dirty and ultimately clogged.

A rectangular mounting plate 24 may be secured to, or if desired, be an integral part of the indicating device 12 and includes cutouts 26 along each of its side edges 28. As best seen in FIG. 2, these cutouts 26 are designed to accommodate appropriate and conventional fastening means, such as bolts 30, used to secure the indicating device 12 to the engine 14 or if desired, to another fixed surface, such as an instrument panel of a vehicle.

Except as hereinafter noted, the structure of the indicating device 12 is described in my aforesaid application and the description in that application is incorporated herein by reference. In summary, however, device 12 comprises a substantially cylindrical housing 32, preferably molded from a suitable plastic material, and consists of an annular side wall 34 and an upper integral end wall 36. The walls 34 and 36 define a chamber 38 within the housing 32. Projecting upwardly from the end wall 36 is a central neck 40 which receives, and is secured to the lower end of the air tube 16 by means of a conventional fitting 41 (FIG. 2) and which has a central passage 42 therein for permitting communication between the air line 18 and the chamber 38. A lower integral portion 44 of the neck 40 depends from the end wall 36 into the chamber 38. A bore 46 is formed in this lower portion 44 and is coaxial with, in communication with, but has a larger diameter than the passage 42.

An annular, outward offset 48 is formed about the lower end or bottom of the side wall 34. This offset 48 includes an annular, right angled shoulder 50.

Forming and defining the lower end of the housing 32 is a cylindrical end member 52 which may be a metal stamping or made from molded plastic and which has a bottom wall 54, an integral, annular side wall 56 and an integral, annular flange 58. The outer diameter of the flange 58 is substantially equal to that of the inner diameter of the offset 48 and as shown in FIGS. 3 and 4, the flange 58 is snuggly received within the offset 48, adjacent to its shoulder 50. Conventional means, such as a snap ring 60, may be used to retain the end member 52 within the offset 48.

A cup-shaped diaphragm 62, formed of pliable plastic, is disposed within the housing 32. The diaphragm has a bottom wall 64 and an integral annular side wall 66 terminating in an annular flange 68. The flange 68 is positioned between the shoulder 50 and the flange 58 and is secured in that position by the snap ring 60.

Seated upon and either adhesively or mechanically secured to the bottom wall 64 of the diaphragm 62 is an upright, tapered cup-shaped indicating member 70 formed of rigid molded plastic. The member 70 has a bottom wall 72 overlying the bottom wall 64 of diaphragm 62 and an integral, annular, flared side wall 74 that terminates in a vertical, upper rim portion 76. This rim portion 76 may be brightly colored and may serve as readily visible indicator such that its vertical position within the chamber 38, may indicate the amount of restriction or extent of contamination of the air filter element in the unit 20. The bottom wall 72 of the member 70 has a substantially narrower width or radius than the underlying bottom wall 64 of the diaphragm 62.

A centrally disposed, tubular guide 78, formed as an integral part of the member 70, and extends upwardly, in the chamber 38 from the bottom wall 72 and into the bore 46. The outer diameter of the guide 78 is slightly less than the inner diameter of the bore 46 so that air may pass therebetween and so that the guide may freely slide within that bore. The guide 78 extends through a sealed, central opening in the bottom wall 64 of the diaphragm 62 and has a central coaxial bore 80 therein that opens into the lower portion 82 of the chamber 38, i.e. the portion of the chamber below the diaphragm 62. An integral, radially inwardly projecting flange 84 is formed about the bore 80, adjacent to, but spaced slightly upwardly from, the open, downwardly facing end 86 of the bore 80. The guide 78 has a length so that it cannot to be fully withdrawn from within bore 46 when the diaphragm 62 is folded in upon itself as shown in FIG. 3.

A coil compression spring 88 is disposed within the upper portion 90 of the chamber 38, i.e. the portion above the diaphragm 62. The spring 88 has its upper end bearing against the inner, lower side of the end wall 36 and its lower end bearing against the inner, upward facing side of the bottom wall 72 of the member 70. The spring 88 urges or biases the diaphragm 62 and member 70 toward their positions illustrated in FIG. 3.

The upper portion 90 of the chamber 38 is sealed from the exterior atmosphere and is in direct communication with the air in the air line 18. Thus contaminants in the atmosphere surrounding the device 12 do not affect the condition or operation of either the indicating member 70 or the spring 88. The diaphragm 62 is tightly sealed, as by a conventional snap ring 92, about the guide 78, and this seal prevents any communication between upper and lower portions 90 and 82 of the chamber 38.

As best illustrated in FIG. 2, vertically spaced, horizontal lines 94 may be placed on the side wall 34 of the housing 32 and may serve to provide a visual indication, together with the rim portion 76 of the member 70, of the restriction levels of the filter element in unit 20. For example, when the rim portion 76 reaches the uppermost band 96, this may be used to signify that the filter element is fully restricted and requires cleaning or replacement. The particular indicia lines, however, shown in the drawings, are merely for illustration.

The bottom wall 54 of the member 52 has a centrally disposed, relatively small hole 98 therein. A tubular wall 100 depends downwardly from and is integral with the bottom wall 54, with the central axis of the wall 100 being coaxial with the hole 98. Three, regularly spaced slots 102 are formed in the distal edge of the wall 100 and serve to divide the edge into three segments.

An elongated, molded plastic locking member 104 is disposed, intermediate its ends, within the hole 98, so that its lower projecting end 106 extends through the hole and from the chamber 38. The upper end 108 of the locking member 104 extends upwardly, into the bore 80 in guide 78 and past the flange 84. The length of the upper end 108 is such that it remains within the bore 80 and extends past the flange 84 even when the diaphragm 62 and member 70 are moved to the position shown in FIG. 4.

The locking member 104 has a generally cylindrical cross-section except for a flat form thereon and extending from one end to the other. A plurality of teeth or notches 110 are formed on and project from this flat adjacent to the upper end 108 and each of these teeth are adapted to engage the flange 84 when they are brought into contact with it.

A partial, transverse, flange 112 is integrally formed on the locking member 104, intermediate between its upper and lower ends, and extends from the member 104 in a radial direction opposite to that of the teeth 110. This flange 112 rests on the upper surface of the bottom wall 54, adjacent to the hole 98 and serves as a pivot or pivot point about which the ends of the locking member 104 may be rocked or swung through an arc about the vertical. The central axis of the locking member 104 is normally offset, i.e., disposed at an angle with respect to the vertical as illustrated in FIGS. 3 and 4, so that one of the teeth 110 is engaged in a tooth to tooth relationship, with the flange 84 on the guide 78. The normal relationship between the teeth 110 and the flange 84 is such that relative upward movement of locking member 104, with respect to the guide 78, is permitted but relative downward movement of the locking member 104, with respect to the guide is prevented due to the engagement of one of the teeth 110 with the flange 84. The distal end portion 114 of the lower end 106 of the locking member 104 has a transverse groove 116 that is generally perpendicular to the flat on the side of the locking member. Two oppositely facing flanges 118 formed on and extending from the bifurcated parts of the end portion 114, as defined by the groove 116. An annular cap 120 has a radially outwardly extending flange 122 on its lower end and has a central bore 124 therethrough adapted to receive the distal end portion 114. The cap 120 is snap-fitted over the end portion 114 and is held on the end portion 114 by cooperation between the flanges 118 and an internal partial shoulder 126 formed in the bore 124.

The lower facing, transverse surface of the cap 120 has a cutaway, semicircular portion 128. An integral finger 130 is formed on the outer surface of the flange 122 at a point generally perpendicular to the diameter defining or dividing the cutaway portion 128 from the remaining, semicircular portion of the flange 122. Due to the cooperation between the flanges 118 and the shoulder 126, the finger 130 is positioned on the same side of the locking member 104 as the flange 112.

The finger 130 extends upwardly from the flange 122 in a direction generally parallel to the axis of locking member 104. The upper, distal end of the finger 130 is spaced above the upper end of the cap 120 and with the distance between the upper end of the finger 130 and the flange 112 being slightly greater than the thickness of the bottom wall 54.

A coil compression spring 132 is disposed about the distal end portion 114 of the locking member 104 and extends between the bottom wall 54 and the upper facing surface of the flange 122 on the cap 120. The spring 130 urges the cap 120 against the flanges 118 and away from the bottom wall 54.

As best shown in FIGS. 3 and 4, the lower distal end portion 114 of the locking member 104 and the cap 120 lie slightly above a plane defined by the distal end of the depending wall 100. A generally hat-shaped, relatively flexible cover 134 is snap-fitted and held within the distal end of the wall 100. A central integral button portion 136 of the cover 134 extends downwardly from the remaining portion of the disc. The diameter of the bottom portion 126 is slightly smaller than the diameter of the cap 20.

An annulus 138 of conventional filter material is disposed in the annular space between the cover 134, the bottom wall 54 and the wall 100, and about the distal end portions 114 of the locking member 104. This filter annulus 138 prevents the entry of most dirt or dust particles into the lower portion 82 of the chamber 38.

When the disc 134 is pressed upwardly, i.e., toward the bottom wall 54, the cover 134 abuts the lower facing end surface of the cap 120. This causes the locking member 104 to pivot about the flange 112 toward the vertical, and also causes the cap 120, and the distal end portion 114 to move slightly upwardly relative to the bottom wall 54. Continued pressure on the cover 134 causes the distal end of the finger 130 to abut the bottom wall 54. This abutment, and the application of further pressure on the cover 134, assists in forcing the upper end 108 of the locking member 104 to pivot toward the vertical until the teeth 110 are swung out of engagement with the flange 84. When this occurs, the spring 88 returns the diaphragm 62 and member 70 to their positions shown in FIG. 3, provided of course, that vacuum in the upper portion 90 of the chamber 38 does not preclude such movement of the diaphragm and member.

Since the invention disclosed herein may be embodied in other specific forms without departing from the spirit or central characteristics thereof, the preferred embodiment described herein is therefore to be considered in all respects as illustrative and not restrictive, the scope of my invention being indicated by the appended claims, rather than by the foregoing description.

I claim:

1. In an improved air filter restriction indicating device for an air filter used with an internal combustion engine wherein the improved indicating device is in communication with the air flowing from the air filter to the air intake of the internal combustion engine and wherein the improved indicating device includes: a housing having a first end, a second end, and a side wall that includes a transparent portion, with the first and second ends and side wall defining a cylindrical, overall chamber in the housing and with the second end having an opening therein; a flexible diaphragm member disposed within the housing, with the diaphragm member having a central portion and an edge portion secured to the housing so that the diaphragm member divides the overall chamber into a first chamber, adjacent to the first end of the housing, and a second chamber, adjacent to the second end of the housing, and with the central portion of the diaphragm member being movable between an infold portion wherein it is more closely adjacent to the second end of the housing and an outfold position wherein it is more closely adjacent to the first end of the housing; an indicating member that is disposed within the first chamber in the housing and that is mounted on and carried by the diaphragm member, the indicating member being visible through the transparent portion of the side wall of the housing at least as the diaphragm member moves between its infold position and its outfold position; means for permitting communication between the air flowing from the air filter to the air intake of the internal combustion engine and the first chamber in the housing; means for permitting communication between the atmosphere and the second chamber in the housing; a coil compression spring disposed in the first chamber of the housing, with one end of the compression spring being in contact with the first end of the housing and the other end of the compression spring being in contact with the indicating member, with the compression spring having a compression force sufficient to balance the differential between atmospheric pressure in the second chamber of the housing and the vacuum being drawn in the first chamber by the air flowing from the air filter to the air intake of the internal combustion engine so that the indicating member will deform the diaphragm member into its infold position when the vacuum in the first chamber is relatively low and so that the diaphragm member, and the indicating member, will be moved from its infold position toward its outfold position in response to increases in the vacuum in the first chamber; and lock-up means for progressively locking the indicating member in the various positions which the indicating member attains within the first chamber as the diaphragm member moves from its infold position to its outfold position and for maintaining the indicating member in its last such position even though the diaphragm member may thereafter return towards its infold position due to a subsequent decrease in the vacuum in the first chamber; the lock-up means including a centrally disposed cylindrical rod which is mounted on and carried by the central portion of the diaphragm member, which is in part disposed in the first chamber, and which projects from the diaphragm member toward the first end of the housing, with the cylindrical rod having a recess defined by a closed end, projecting towards the first end of the housing, an internal side wall, and an open end that is in communication with the second chamber; the lock-up means also including an elongated locking member having a first end and a second end, with the locking member being supported, for pivotal movement intermediate its ends, by a first portion of the second end of the housing, so that the second end of the locking member may be selectively, pivotably moved in the recess in the cylindrical rod through a predetermined arc, and with the second end of the locking member normally being disposed adjacent to the open end of the cylindrical rod and cooperating with the open end of the cylindrical rod so that the indicating member is progressively locked and maintained in position by engagement between the second end of the locking member and the cylindrical rod, the improvement comprising:

means for selectively pivoting the first end of the locking member through the predetermined arc and thus causing the second end of the locking means to pivot through the predetermined arc, in the recess in the cylindrical rod, the pivoting means including means carried by the first end of the locking member; a relatively flexible resetting cover which has an external surface and an internal surface, which is mounted on a second portion of the second end of the housing spaced from the first portion of the second end of the housing in a direction parallel to the path of movement of the indicating member, and which is disposed adjacent to the carried means and in a plane substantially perpendicular to the path of movement of the indicating member; the resetting cover being deformable toward the first portion of the second end of the housing when a person or object pushed against its external surface, so that the internal surface of the resetting disc will contact the carried means when the resetting cover is deformed and will thereby cause the first end of the locking member to be pivoted through the predetermined arc.

2. The improved air filter restriction indicated device described in claim 1 wherein the carried means is a cap having a surface which is disposed adjacent to the internal surface of the disc and which is substantially perpendicular to the longitudinal axis of the locking member; wherein the surface of the cap has a substantial cutaway portion; and wherein the internal surface of the cover contacts the non-cutaway portion of the surface of the cap.

3. The improved air filter restriction indicating device described in claim 2 wherein the cap includes a finger which is adjacent to the cutaway portion of the cover and which projects from the cap toward the first portion of the second end of the housing; and wherein deformation of the cover will cause the distal end of the finger to abut the first portion of the second end of the housing and thereby assist the pivoting of the first end of the locking member.

4. The improved air filter restriction indicating device described in claim 3 wherein a coil compression spring surrounds the first end of the locking member and extends between from the cap and the first portion of the second end of the housing and serves to bias the cap away from the first portion of the second end of the housing in direction substantially parallel to the path of movement of the indicating member; and wherein the second portion of the second end of the housing is a tubular wall projecting from the second end of the housing adjacent to the first portion of the second end of the housing.

5. The improved air filter restriction indicating device described in claim 3 wherein the resetting cover has a central, button portion that projects away from the cap and that has a diameter substantially slightly less than the diameter of the cap.

* * * * *